United States Patent

Puglia

[11] Patent Number: 6,067,040
[45] Date of Patent: May 23, 2000

[54] LOW COST-HIGH RESOLUTION RADAR FOR COMMERCIAL AND INDUSTRIAL APPLICATIONS

[75] Inventor: Kenneth Vincent Puglia, Westford, Mass.

[73] Assignee: The Whitaker Corporation, Wilmington, Del.

[21] Appl. No.: 08/867,341

[22] Filed: May 30, 1997

[51] Int. Cl.⁷ .................................................. G01S 13/12
[52] U.S. Cl. .......................................... 342/134; 342/137
[58] Field of Search ..................................... 342/194, 195, 342/28, 109, 114, 115, 128, 137, 134, 135

[56] References Cited

U.S. PATENT DOCUMENTS

| | | | |
|---|---|---|---|
| 2,851,120 | 9/1958 | Fogiel | 180/82.1 |
| 3,152,326 | 10/1964 | Merlo | 343/7 |
| 3,680,104 | 7/1972 | Westaway | 342/201 |
| 3,731,306 | 5/1973 | Andrews | 343/5 R |
| 3,988,704 | 10/1976 | Rice et al. | 359/250 |
| 4,131,889 | 12/1978 | Gray | 343/8 |
| 4,217,582 | 8/1980 | Endo et al. | 343/7 VM |
| 4,499,467 | 2/1985 | Rittenbach | 343/9 R |
| 4,908,628 | 3/1990 | Cashen et al. | 342/134 |
| 5,117,230 | 5/1992 | Wedel, Jr. | 342/169 |
| 5,230,076 | 7/1993 | Wilkinson | 455/62 |
| 5,345,471 | 9/1994 | McEwan | 375/1 |
| 5,469,167 | 11/1995 | Polge et al. | 342/25 |
| 5,517,197 | 5/1996 | Algeo et al. | 342/70 |
| 5,686,921 | 11/1997 | Okada et al. | 342/127 |

FOREIGN PATENT DOCUMENTS

| | | | |
|---|---|---|---|
| 44 07 369 A1 | 9/1995 | Germany | G01S 13/10 |
| 2 077 545 | 12/1981 | United Kingdom | G01S 13/10 |

*Primary Examiner*—John B. Sotomayor

[57] ABSTRACT

A low-cost, high-resolution radar based detection system has a pulse repetition frequency generator connected to first and second narrow pulse modulators. A transmit channel is connected to the first narrow pulse modulator and emits pulse modulated carrier based transmit signals having a prescribed carrier frequency and a prescribed duration. A receive channel is connected to the second narrow pulse modulator. A time delay circuit delays the output of the second pulse modulator to the receive channel and a mixer mixes a portion of one of the pulse modulated carrier based transmit signals reflected from an object with the output of the second narrow pulse modulator.

12 Claims, 4 Drawing Sheets

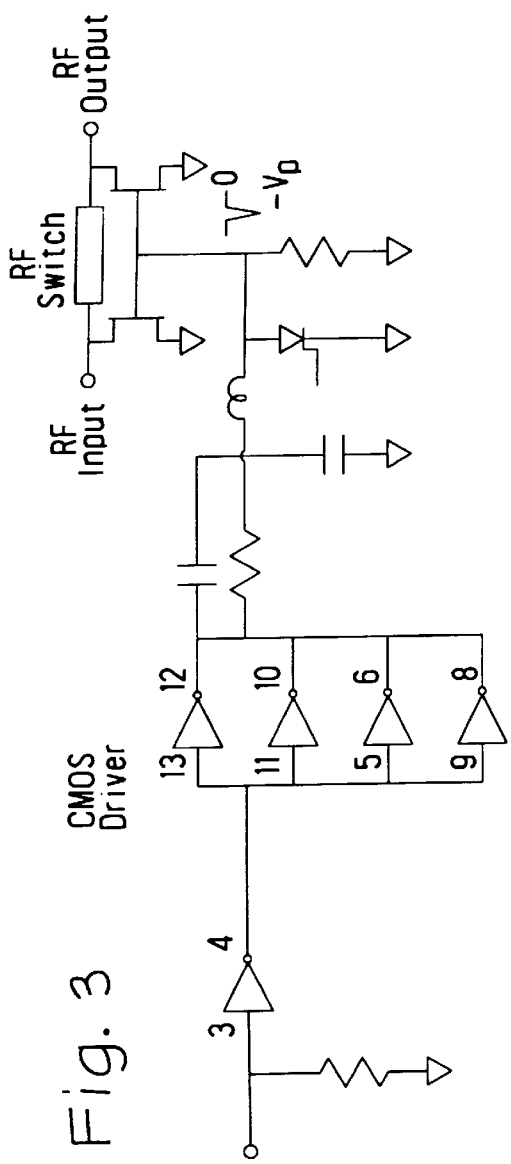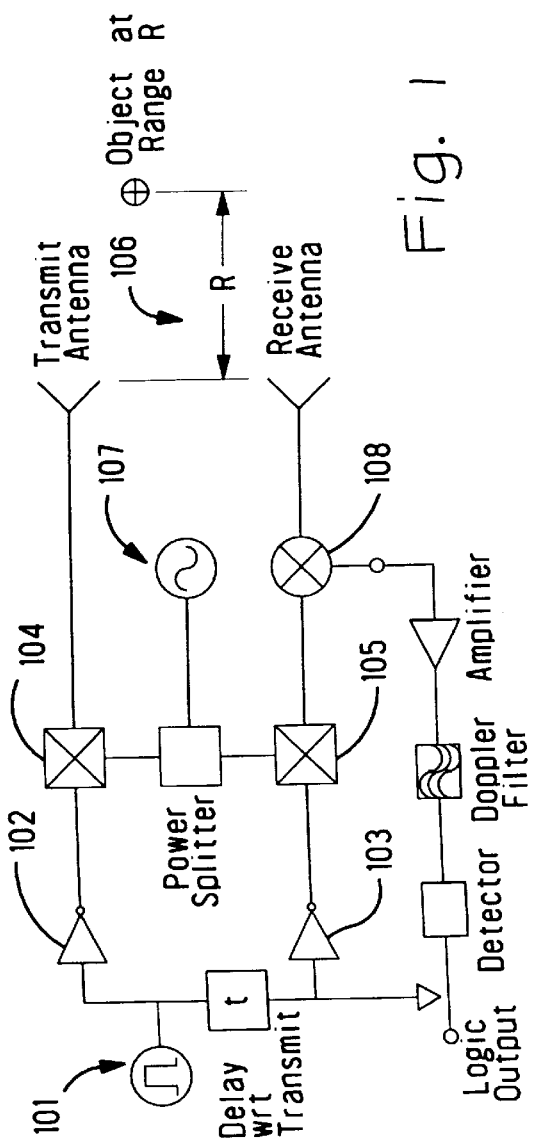
Fig. 3
Fig. 1

LOW COST-HIGH RESOLUTION RADAR FOR COMMERCIAL AND INDUSTRIAL APPLICATIONS

FIELD OF THE INVENTION

The present invention relates to a carrier based radar system for detection of moving and stationary objects.

BACKGROUND OF THE INVENTION

In the realm of radar systems, there is a variety of basic technologies which are utilized to effect radar sensing systems for various applications. One basic type of radar based system is frequency modulated-continuous wave (FM-CW) radar system which emits a swept frequency electromagnetic signal at microwave or rf frequency and compares the frequency emitted with that of the frequency of the echo, resulting in a beat frequency. These FM-CW based radar sensors can be used for determination of range or in the case of a nonranging radar sensor, the systems emit a CW microwave carrier and can be used to determine velocity by the generation of the Doppler frequency shift from the moving object. Unfortunately, as is spelled out in U.S. Pat. No. 5,361,070, the disclosure of which is incorporated herein by reference, such FM-CW and Doppler radar systems based thereon have a number of drawbacks.

The aforementioned U.S. Patent to McEwan is based on a different technology to overcome some of the limitations in the FM-CW radar sensor technologies and is described herein. The system to McEwan is based on an ultra-wideband (UWB) radar motion sensing system which operates as a pulse echo system clocking the two-way time of flight of an electrical pulse of very short duration in time. The reference to McEwan is based on a carrier-free system, in which the electromagnetic radiation is a narrow pulse. The McEwan reference discloses the emission of pulses having a duration on the order of 200 pico-seconds. Such an emission results in a system having a spectrum ranging from on the order of DC to the order of a few GHz. Clearly, as is well known to one of ordinary skill in the art, the rate of change of voltage of the emitted pulse with respect to time, the first derivative with respect to time, has a direct relation to the spectral width. Accordingly, a pulse having a short duration in the time domain will have a large span in the frequency domain. This follows directly from fourier analysis. So, for example under the UWB system of McEwan, a pulse repetition frequency (PRF) signal the frequency at which the repetitive pulses of electromagnetic radiation are emitted is emitted at the transmitting antenna. With a prf of 100 Khz, with each pulse having a duration on the order of a few hundred pico-seconds, the resulting spectral distribution spans roughly 100 KHz to 3.0 GHz. While such a system enables the sensing of moving objects, there are clear drawbacks to the practical implementation of such a system.

The use of UWB non carrier based systems, such as is disclosed in the reference to McEwan, has the primary drawback of directionality or focus of the emitted beam. To this end, in most applications of proximity sensors and motion detectors, it is desired if not required that the sensing be done in a narrowly prescribed physical path. For example, were the sensor to be used for detection of objects behind a vehicle in a parking aid application, a very narrow region directly behind the vehicle would be desirably sensed for obstructing objects. Accordingly, such a sensor would require a narrowly focused or directionally focused beam for sensing objects with the radar system. Unfortunately, in a carrier-free UWB system it is very difficult to have an antenna capable of operating with the bandwidth and at the center frequency of the UWB system as is described in the reference to McEwan.

Accordingly, what is needed is a system for detection of objects both stationary and moving that has the high position resolution of a high frequency relatively wide bandwidth radar system which can be directionally focused in order to effect an accurate and reliable sensing system.

SUMMARY OF THE INVENTION

The high resolution radar system of the present disclosure is a carrier pulse type, object position and velocity measurement radar system in which a narrow pulse modulated carrier signal is generated and transmitted to a specified region by the use of a directional antenna. An object within the region and range prescribed will partially reflect the transmitted signal. This reflected signal is received by the high resolution radar receiving antenna and processed thereafter. The signal which is transmitted is a carrier based signal. To this end, as is shown in FIG. 1, a modulator driver, or pulse repetition frequency generator, sends a signal to both the transmit and receive channels of the high resolution radar. On command, the transmit channel generates the narrow transmission signal by way of a narrow pulse modulator. The output signal at the transmitter, a pulse modulated carrier based signal, has a resultant fourier transform with a center frequency at the carrier frequency and fourier components expanding on the order of $1/t_w$, where $t_w$ is the pulsewidth. The receive channel delays the command for a period of time commensurate with the two-way travel time of an object at range, R. The receive channel narrow pulse modulator functions as the local oscillator signal used for processing the receive channel. To this end, the signal received by the reflection of a transmitted pulse is mixed as shown in FIG. 1 with the signal from the narrow pulse modulator, the same signal that is transmitted at the transmit antenna delayed by the appropriate time of flight for the distance R. To be clear, the receive channel narrow pulse modulator signal which functions as the local oscillator signal in the present invention is identical to the transmit signal transmitted at the transmit antenna, however delayed by the time of flight commensurate with the object range R. This time delay is referenced as $t_d$. Mixing this signal with the signal received from a non-stationary object at a distance R results in a DC output from the mixer.

In the event that the object is stationary, a first pulse is emitted at the transmitter with an identical pulse delayed by a time $t_d$ being sent to the mixer as the local oscillator signal. The reflected signal from the stationary object has the same frequency as the pulse delay by $t_w$ but has a phase delay term of $2R_0/\lambda$ where $R_0$ is the object distance. Mixing the delay pulse with the receive pulse gives a difference term proportional to the phase delay. The output of the mixer results in a series of DC levels, one for each transmitted pulse and the receive pulse therefrom. This sample-and-hold aspect of the present invention will enable a threshold to be set for various applications. In either moving object or stationary object detection applications, a quadrature mixer can be used and the threshold DC level can be used for measurement/threshold analysis.

In another application of the present invention, the high resolution radar can be utilized to measure range and velocity of an object. In this application, a CW pulse is again generated and appropriately gated to generate a pulse transmit signal having a carrier frequency of a predetermined value. In this application, a preset delay time between the sending of the transmit signal to the transmit antenna and an identical signal to the receive channel is determined and remains constant. As an object moves towards or away from the transmit antenna, the signal received at the receiver antenna is shifted between each successive pulse, a doppler shift being realized. In this application, the change in phase term between each successively received pulse when compared to the transmitted pulse corresponding thereto will render the change in the phase relation per unit time, thereby the doppler frequency of an object moving through a range, R. A straight-forward calculation using the doppler frequency will give the radial velocity of the object.

Accordingly, the present disclosure is drawn to a pulse radar system having a transmitted pulse on the order of 100–400 pico-seconds which facilitates precise position and velocity measurements enabling ranging of the object. Furthermore, the present invention enables a highly directional and focused radar system without the attendant cost, power requirements and high speed signal processing of typical pulsed radar systems.

OBJECTS, FEATURES AND ADVANTAGES

It is an object of the present invention to have a highly focused, high resolution carrier based radar systems for object detection, velocity determination and ranging.

It is a feature of the present invention to have a narrow time-duration, pulse modulated carrier-based radar system radar measurements of stationary and moving objects using quadrature detection.

It is a further feature of the present invention to have an antenna capable of producing a directionally focused signal centered about the carrier frequency of the pulse of electromagnetic radiation.

It is an advantage of the present invention to have a low cost sensing system not subject to the high speed signal processing requirements associated with conventional pulse radar systems.

It is a further advantage of the present invention to have band selectivity at millimeter and microwave frequency for the radar system of the present invention by virtue of the modulated carrier system.

BRIEF DESCRIPTION OF THE DRAWINGS

FIG. 1 is a block diagram of the high resolution system of the present invention.

FIG. 3 is a schematic diagram of the narrow pulse modulator of the present invention.

DETAILED DESCRIPTION OF THE PREFERRED EMBODIMENTS

Figure 2:
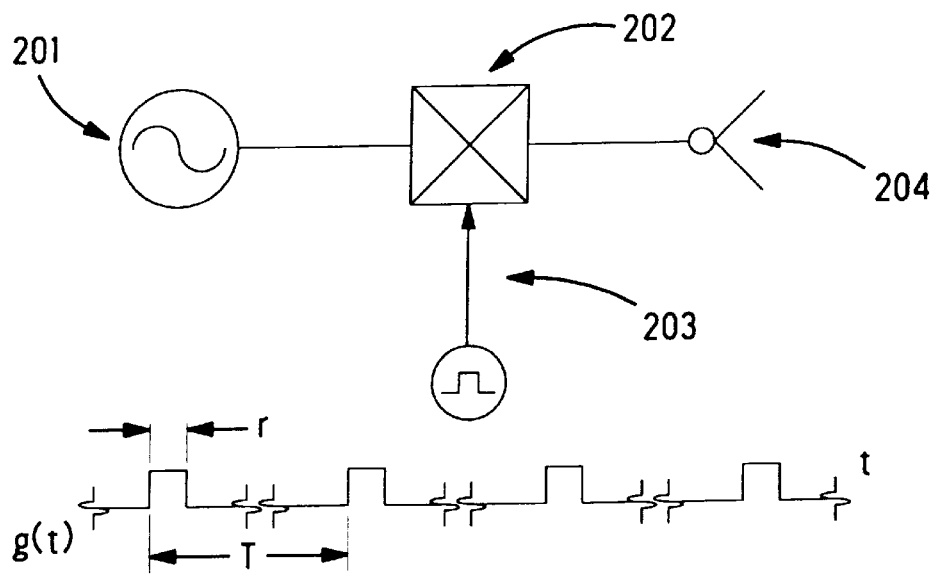
FIG. 2 is a perspective view of the output transmission signal and receive signal at selected time intervals.
Figure 2:
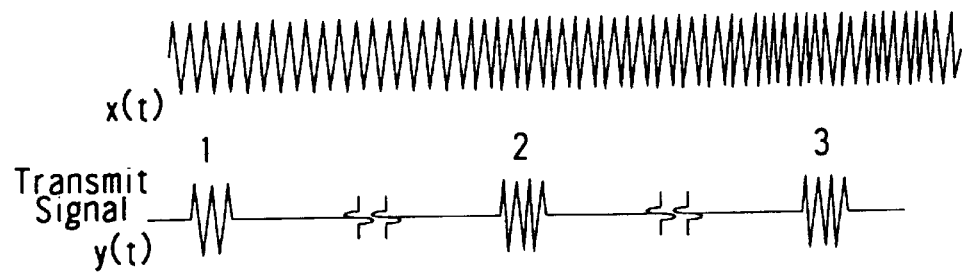
Figure 2:
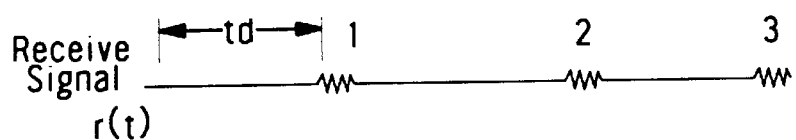
Figure 2:
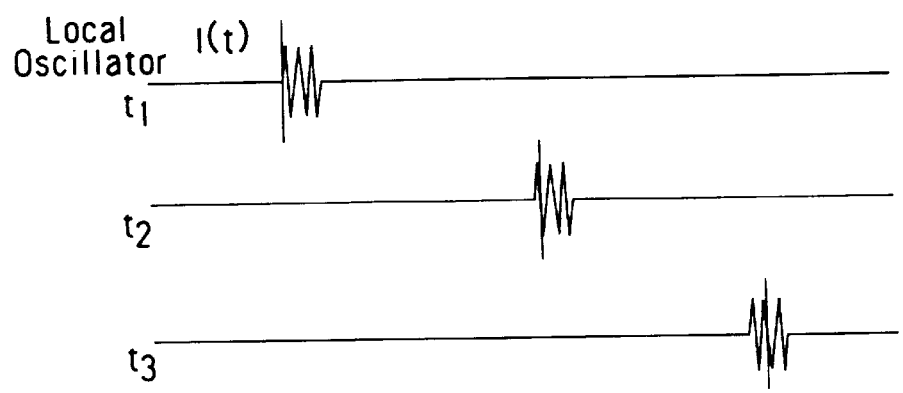

Turning to FIG. 1, a modulator driver 101 is shown as the input to a transmit gate 102 and a receive gate 103. The pulse repetition frequency generator (PRF), another term for the modulator driver, sends a signal to both the transmit and receive channels of the high resolution radar system. The transmitter channel generates the narrow transmission signal via the narrow pulse modulator 104, while the signal delivered to the narrow pulse modulator 105 of the receive channel is delayed as described herein. In a mode where the object is substantially stationary, this delay time is initially chosen to be at a preselected object range R as shown at 106. The pulsed nature of the transmit signal as well as the input at the local oscillator from the narrow pulse modulator is effected by the mixing of the signals from the modulator driver 101, delayed in the case of the receive channel, with the output of the continuous wave source 107. This continuous wave source is preselected depending on application, but it is anticipated that the frequency of the continuous wave source 107 is in the microwave to millimeter wave band.

Output from the receive channel narrow pulse modulator 105 is used to generate the local oscillator signal which is mixed with the received signal from the reflection from an object at a given range $R_0$ where $R_0$ is object range. In an application where the object is moving with respect to the radar system, the delay can remain fixed, commensurate with a given range, or the range may be electronically varied to effect range scanning or object tracking. The Doppler signal may be recovered via multiple samples of the signal present at a particular range. Detection of both stationary and non-stationary objects are described further herein.

Turning to FIG. 2, the transmit and receive functions are shown in detail. To this end, a microwave source 201 emits a continuous wave signal to a narrow pulse modulator 202 which is mixed or multiplied with input from a signal from a modulator driver 203. The input from the microwave/millimeter wave source 201 is represented as x(t) and the input from the modulator driver, a pulse signal having a period T, is represented by g(t), for the gating function. The output of the narrow pulse modulator is represented as y(t) at the antenna 204. As shown in FIG. 2, the output from the modulator driver is represented as g(t). Beneath this representation is the CW input x(t) from the microwave source. For purposes of example x(t) is denoted at a microwave frequency, however as stated above, this can be a millimeter wave frequency. Finally, directly beneath the CW representation, is y(t) which is the pulse modulated output signal separated by a period T, and with designations 1, 2, and 3 for purposes of example. Finally, beneath the transmitted signal y(t) is a representation of the signal reflected from an object fixed in location at a distance R, where:

$$R = \frac{c\tau_d}{2}$$

where c is the speed of light, $\tau_d$ is the time delay between the emission of the signal and the reception of the reflection as is represented in the figure.

FIG. 2 shows the sequence of a receive signal with the mixer being a sample—and—hold device as discussed herein. In the instance where an object is moving, a true Doppler frequency is measured. A transmit signal shown in FIG. 2 as y(t) is shown in three successive pulses in the figure as 1, 2, 3. The first transmitted signal 1, is reflected from an object which is moving. The local oscillator with delay at time $t_1$ has a pulsed signal as is shown, which is mixed at the mixer with the first received signal from the first reflection shown directly thereabove as r(t). The resultant output from the mixer is represented by a voltage level proportional to $\cos \phi_1$, where $\phi_1$ is the difference in phase between the transmitted signal and the received signal from the object. At $t_2$, the second pulse emission is received and thereafter mixed with the local oscillator signal to effect a second mixer output represented by cos $\phi_2$, again a voltage level proportional to cos $\phi_2$. Finally, in the example of the present description, $t_3$ represents the time at which the local oscillator delay signal reaches the mixer and is mixed with the third pulse, having been reflected from the object. This results in a third level proportional to cos $\phi_3$. This process results in a series of output levels which result from the use of a local oscillator signal which is delayed and modulated and is thereafter mixed with the receive signal, with the mixer functioning as a sample—and—hold device. The sample time aperture is equal to the width of the narrow pulse modulator. The change in phase per unit time between the respective phase terms ($\phi_1$, $\phi_2$, $\phi_3$ . . . ) results in a series of voltage levels stored in a storage capacitor.

Clearly, a moving object is identified at a determined range by fixing the delay, whereby the Doppler frequency offset is detected, or reconstructed by the mixer functioning as a sample—and—hold device. The first derivative of the change in phase per unit change in time will render the Doppler frequency. From this value, parameters such as the velocity can be determined. Applications of this radar system on moving objects can be in the detection systems where the radar system is fixed and the object is moving, as well as where the radar system is moving and the object is fixed, for example in a proximity sensor for vehicular applications to include parking aid sensors, and smart cruise control systems. Clearly, it is the relative velocity of the high resolution radar system and the object which enables the Doppler frequency shift measurement.

Essential to the detection of low level signals is the ability to correlate and coherently sum several return pulses. The mixer, acting as a sample-hold device, is the first step in such a process. Several pulses are utilized to reconstruct the Doppler signal at the output of the sample-hold. Subsequent amplification and filtering are employed to strengthen the signal and limit the noise content.

Figure 4:
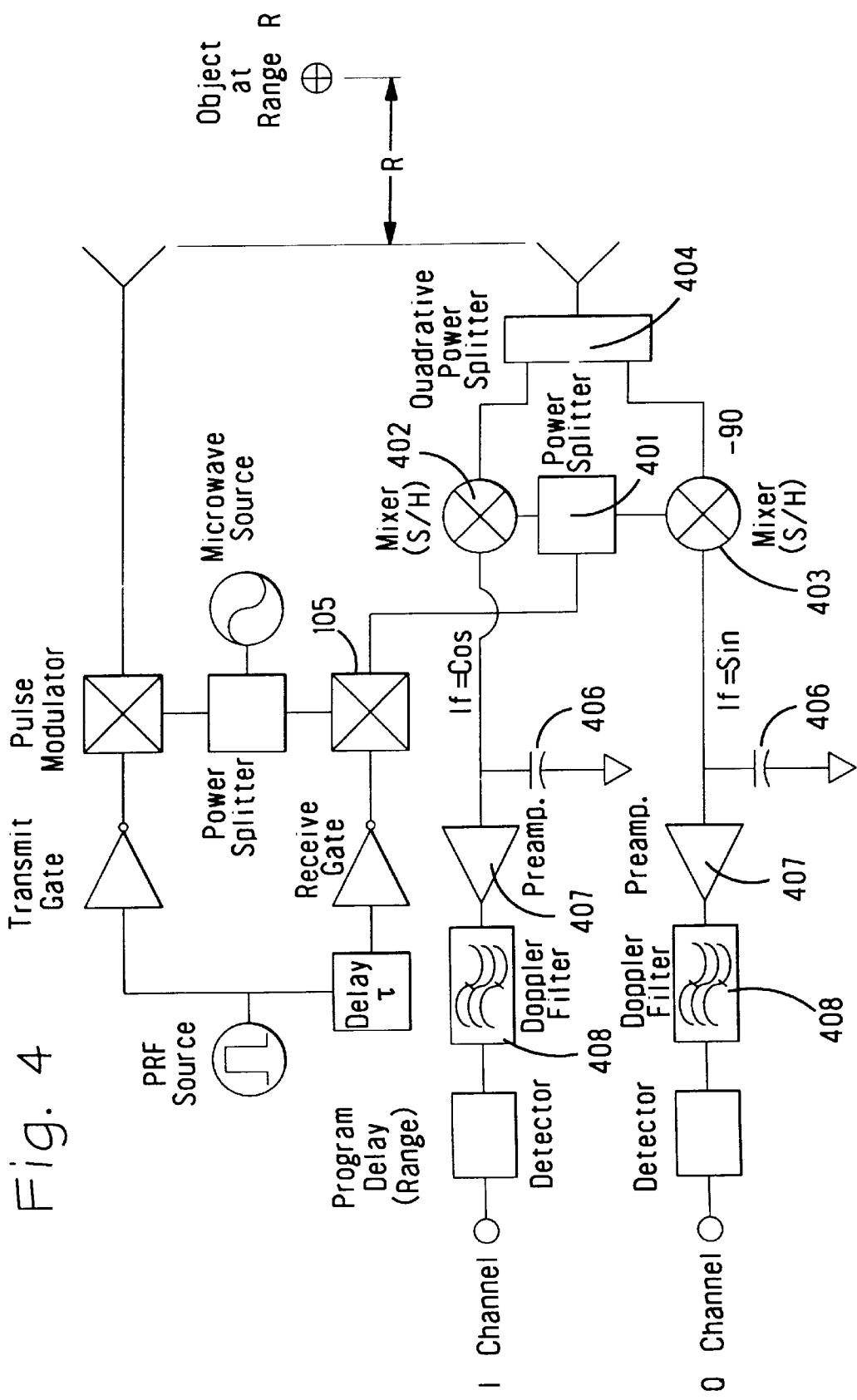
FIG. 4 is a schematic diagram of the narrow pulse modulator of the preferred embodiment having a quadrature mixer and summing device for quadrature detection.

FIG. 4 shows an embodiment of the present invention which allows for stationary object detection. The basic electronics of the high resolution radar device is the same as discussed hereinabove, with the addition of a quadrature mixer for reliable stationary object detection. That is, the output of the pulse modulator 105 is input to a second power splitter 401 which inputs a signal to a first mixer 402 and a second mixer 403. The quadrature power splitter 404 has a relative phase shift of π/2 radians, or a minus 90° phase shift. This results in the signal into the mixer 403 being shifted by π/2 relative to the mixer 402. The output from mixers 402 and 403 are fed into hold capacitors 406, preamplifiers 407 and Doppler filters 408. The function of these elements is as described in the earlier system of FIG. 1. The reason for the quadrature detector system is as follows. Transmission of a signal, which is reflected from a stationary object, can be represented as follows:

$$e_v = A\cos\left[2\pi f_o t + \frac{2(2\pi R_o)}{\lambda}\right] \quad (1)$$

where $f_o$ is the frequency, t is the time, and the term $$\frac{2(2\pi R_o)}{\lambda},$$

is a phase shift resulting from the two-way travel of the signal to the object and back to the receiver. The output of the mixer, which is operated as a sample and hold device may be written:

$$e_o = a\cos\left(\frac{4\pi R_o}{\lambda}\right) \quad (2)$$

where a is a constant associated with the received signal strength and $R_o$ is the range to the object and $\lambda$ is the wavelength of the signal. Clearly, when $$R_o = \frac{n\lambda}{8}$$

(n integer), the output of the mixer is zero and a stationary object at this range would not be detected. To circumvent this problem, a quad mixer arrangement is utilized as is shown in FIG. 4 by the mixer 402 and mixer 403 in combination with the phase shift through the quadrature power splitter. Because the signal input to mixer 403 is shifted by 90°, the sine of the argument of the cosine of Equation 1 is realized as the voltage output. This output is shown as the quadrature channel Q while the output of the in phase channel is shown as I. Accordingly, in the event that the range satisfies the relation of Equation 2, object detection of a stationary object is still realized. Clearly, by the very nature of the trigonometric functions sine and cosine, a complementary analysis follows for null values of the sine. Typical application of such a system where an object is fixed and the radar system is also fixed would be in applications such as the detection of a person in front of a sink where the radar system is mounted in the sink fixture to detect the presence of a person who remains relatively stationary, and turns on the water at the sink. Such a system would require the radar to have a narrowly focused beam in a prescribed range. While other applications are clearly available, this one is for purposes of example.

For moving object applications, the quad mixer arrangement shown in FIG. 4 can still be utilized and enables one to distinguish moving objects from stationary objects. As stated previously, a stationary object at a distance Ro results in a phase delay represented by:

$$\phi = \frac{4\pi Ro}{\lambda} \quad (3)$$

where $\emptyset$ is the phase delay, which is used to charge the hold capacitor 406 for appropriate use thereafter. In the event that a moving object is detected, then the argument of the cosign of Equation 1 is:

$$R = Ro + (\upsilon_{obj} * t) \quad (4)$$

where Ro is the range at $t_0$ and $\upsilon_{obj}$ is the object velocity. Accordingly, the output of the mixer in response to a moving object may be written:

$$e_v = a\cos\left[\left(\frac{2\pi R_o}{\lambda}\right) + 2\pi\left(\frac{2vf_o}{c}\right)t\right] \quad (5)$$

Examination of this equation discloses the Doppler frequency component, $$2\pi\left(\frac{2vf_o}{c}\right),$$

present at the output of the mixer thus enabling the ability to distinguish stationary objects from moving objects.

Figure 5:
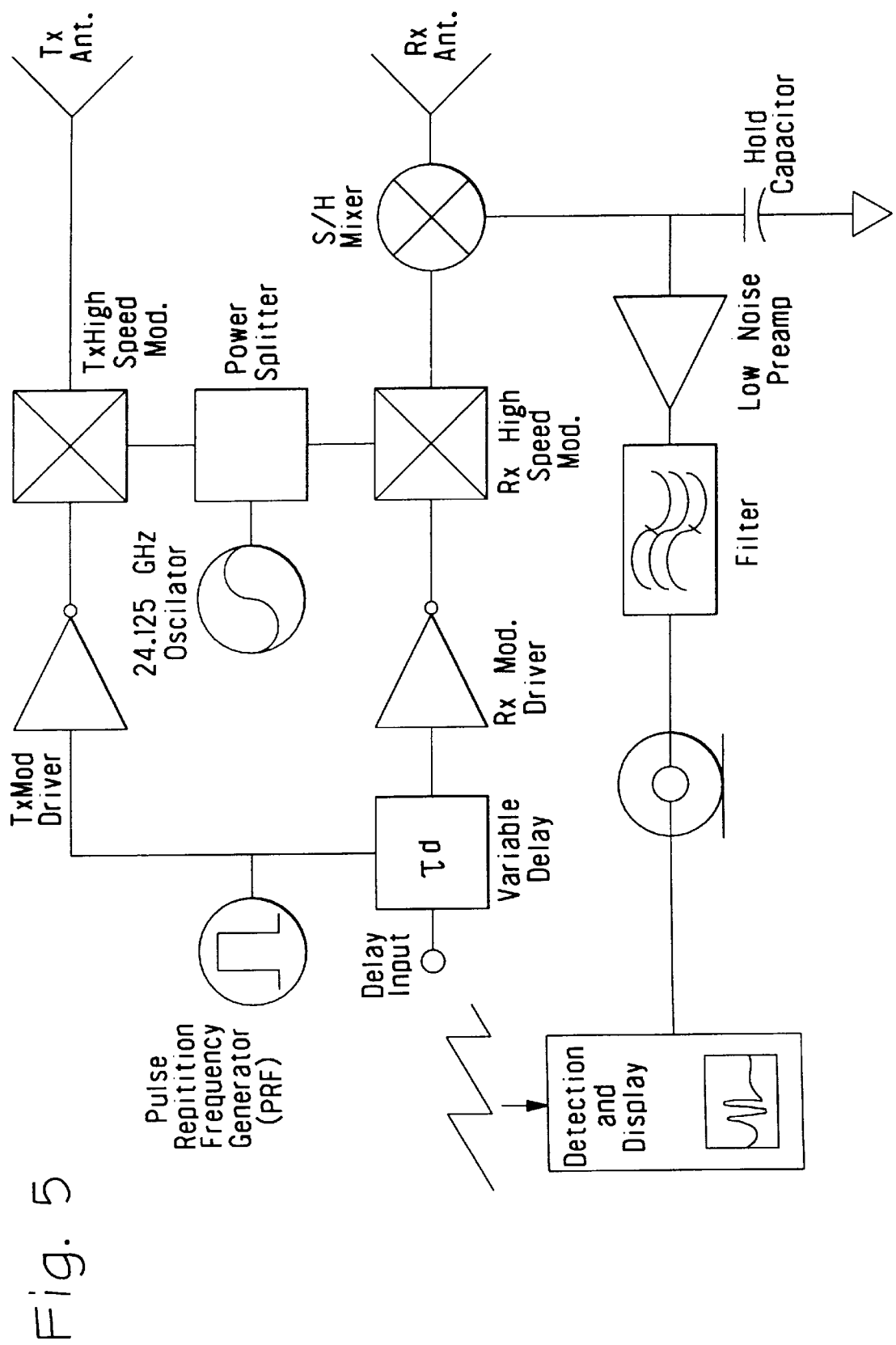
FIG. 5 is a block diagram of the embodiment of the present invention incorporating a variable delay for range scanning.

Another embodiment of the present application is shown in FIG. 5. In this embodiment, a time delay is used in the radar system described above to permit range scanning. The time delay in this embodiment is electronically varied to permit the scanning of the range. Such a system can be implemented using standard techniques for the electronic delay of pulses and thus the a continuous scanning of a range for objects within that range. Such a system has a variety of applications, particularly in automotive applications of radar. The major difference between the system shown in FIG. 5, and the system described above lies in the use of a variable delay 501 shown in block diagram form. It is also possible to use a digital signal processor, with or without the variable delay 501 to facilitate many of the signals required for high resolution radar operation to include the PRF generator and the electronically variable time delay signal, as well as performing calculations with respect to signal detection or other signal processing algorithms.

Finally, it is important to note the component preferences for the various elements in the high resolution (HR) radar system. It is envisioned that the HR radar component preferences are completely semiconductor based with the exception of the antenna. Furthermore, the various implementations to include monolithic and heterolithic, glass based, devices well known to the artisan of ordinary skill are also envisioned. Starting with the microwave source 107 in FIG. 1, the source may be realized in a number of frequency bands using GUNN, bipolar or gallium arsenide transistors; all of which are commercially available. The microwave source is usually a very important component from both a performance and cost perspective. Next, the receiver mixer 108 makes use of Schottky diodes which can be based in silicon or gallium arsenide. Several mixers in a number of frequency bands are commercially available for this purpose, and are well known to one of ordinary skill in the art. The various gating elements, amplifier elements and filter elements as well as the detector for the device as shown in FIG. 1 are envisioned to be standard devices well known to one of ordinary skill in the art. Furthermore, the transmit and receive antennas are likewise standard antenna arrays well known to one of ordinary skill in the art. Finally, the narrow pulse modulator shown in block form at 104, 105 in FIG. 1 is shown schematically in FIG. 3. The RF switch of the narrow pulse modulator utilizes field effect transistor (FET) switches or Schottky diodes which are switched to an off mode using the narrow pulse developed by the step recovery diode. The drive to the step recovery diode is generated by a low cost CMOS inverter available in surface mount device form at a substantially low cost in volume. The RF switch is implemented using 0.10, 0.25, or 0.5 micron FETs, depending upon the application frequency.

The invention having been described in detail, it is clear that variations and modifications of the components as well as their application are readily apparent to one of ordinary skill in the art having had the benefit of the present disclosure. To this end, applications are rather extensive, and some for purposes of example are as follows; automatic doors, sanitary facilities, ground speed indication, automotive blind spot and parking aid sensors, electronic fences, navigation devices, and altimetry. This list is for purposes of example and is not intended to be in any way exhaustive. The primary focus of the invention is the use of a carrier based radar system for detection and measurement of both stationary and moving objects. The device envisions the ability to determine range as well as the ability to ascertain direction of an object giving a true vector output. Furthermore, by virtue of the system as described hereinabove the ability to have a system with a highly directed sensing capability is deemed a novel portion of this invention. To the extent that such modifications and variations of the teaching of the present invention are within the purview of this invention herein summarized, such are deemed to be within the scope of teachings of the present disclosure.

What is claimed is:

1. A radar based detection system, comprising:

a pulse repetition frequency generator connected to first and second narrow pulse modulators;

a transmit channel connected to said first narrow pulse modulator, said transmit channel emitting pulse modulated carrier based transmit signals having a prescribed carrier frequency and said signals having a prescribed duration;

a receive channel connected to said second narrow pulse modulator;

a time delay circuit for delaying output of said second pulse modulator to said receive channel; and a mixer for mixing a portion of one of the pulse modulated carrier based transmit signals reflected from an object with the output of said second narrow pulse modulator.

2. A radar based detection system as recited in claim 1 wherein said first narrow pulse modulator transmits multiple pulses at a predetermined interval; said second narrow pulse modulator transmits multiple pulses at a predetermined interval; and said mixer output is a series of phase relations.

3. A radar based detection system as recited in claim 1, wherein said prescribed carrier frequency is on the order of 5.8 GHz.

4. A radar based detection system as recited in claim 1, wherein said pulse modulated carrier based transmit signals have a center frequency in the millimeter waveband.

5. A radar based detection system as recited in claim 1, wherein said pulse modulated carrier based transmit signals have a center frequency in the microwave band.

6. A radar based detection system as recited in claim 1, wherein said carrier based transmit signals have a bandwidth on the order of 3 GHz.

7. A radar based detection system as recited in claim 1 wherein said transmit channel is connected to a directional antenna.

8. A radar based detection system, comprising:

a pulse repetition frequency generator connected to first and second narrow pulse modulators;

a transmit channel connected to said first narrow pulse modulator, said transmit channel emitting pulse modulated carrier based transmit signals having a prescribed carrier frequency and said signals having a prescribed duration;

a receive channel connected to said second narrow pulse modulator;

a time delay circuit for delaying output of said second pulse modulator to said receive channel; and a quadrature power splitter connected to a receive antenna, said quadrature power splitter splitting a received pulse reflected from an object into a quadrature channel and an in-phase channel for the detection of the object.

9. A radar based detection system as recited in claim 8, wherein said prescribed carrier frequency is on the order of 5.8 GHz.

10. A radar based detection system as recited in claim 8, wherein said time delay circuit has a predetermined time interval that is variable for scanning ranges.

11. A radar based detection system as recited in claim 8, wherein said object is stationary.

12. A radar based detection system as recited in claim 8, wherein said object is moving.

* * * * *